(12) United States Patent
Waskow et al.

(10) Patent No.: US 6,454,035 B1
(45) Date of Patent: Sep. 24, 2002

(54) TILT MECHANISM AND METHOD FOR PIVOTING A VEHICLE BODY PANEL RELATIVE TO A VEHICLE CHASSIS

(75) Inventors: John H. Waskow, Keller, TX (US); Rob A. Cook, Conrad, MT (US); Jeffery E. Kerney, Maple Valley; Robert L. Bundy, Anacortes, both of WA (US); Barry W. Carothers, Flower Mound, TX (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/490,913

(22) Filed: Jan. 25, 2000

(51) Int. Cl.[7] ............................................. B62D 25/10
(52) U.S. Cl. .................................. 180/89.17; 180/69.21
(58) Field of Search ....................... 180/89.17, 69.21, 180/89.14–16; 267/273, 284; 296/27, 190, 35.1; 49/35

(56) References Cited

U.S. PATENT DOCUMENTS

| | | | | |
|---|---|---|---|---|
| 2,362,453 A | * | 11/1944 | Cosper | 180/54 |
| 2,864,121 A | * | 12/1958 | Imber et al. | 16/184 |
| 3,022,536 A | * | 2/1962 | Floehr | 16/75 |
| 3,765,500 A | * | 10/1973 | Reeves | 180/77 TC |
| 3,986,693 A | * | 10/1976 | Johnson | 248/205 |
| 4,158,450 A | * | 6/1979 | Suzuki | 248/1 |
| 4,438,826 A | * | 3/1984 | Bewers | 180/89.14 |
| 4,804,588 A | * | 2/1989 | Murphy, Jr. et al. | 428/683 |
| 5,193,961 A | * | 3/1993 | Hoyle et al. | 411/10 |
| 5,370,483 A | * | 12/1994 | Hood et al. | 411/553 |
| 5,730,239 A | * | 3/1998 | Hotler | 180/69.21 |

* cited by examiner

Primary Examiner—Daniel G. DePumpo
Assistant Examiner—Paul Royal, Jr.
(74) Attorney, Agent, or Firm—Sidley Austin Brown & Wood LLP

(57) ABSTRACT

A tilt mechanism for pivoting a vehicle body panel relative to a vehicle chassis includes a pivot pin having a pivot pin axis. The pivot pin provides a single-point pivot attachment of the body panel to the chassis such that the body panel can articulate about the pivot pin axis relative to the chassis. A support member pivotably connects to the chassis about the pivot pin axis by the pivot pin. The support member has a tilt axis along a longitudinal extent of the support member. The tilt axis is perpendicular to the pivot pin axis. The support member supports the vehicle body panel weight through a pivotal connection between a support member end and the body panel. The pivotal connection allows the body panel to pivot relative to the chassis about the tilt axis via a bearing. A torsion bar is within the support member. One portion of the torsion bar is secured to the support member and another portion is secured to the body panel by a slot that receives a torsion bar end. The torsion bar biases the body panel relative to the chassis along at least an angular portion of a pivotal range about the tilt axis. The slot is hour-glass-shaped such that the body panel can pivot about the tilt axis relative to the chassis without loading the torsion bar over a specified angular range about the tilt axis.

35 Claims, 7 Drawing Sheets

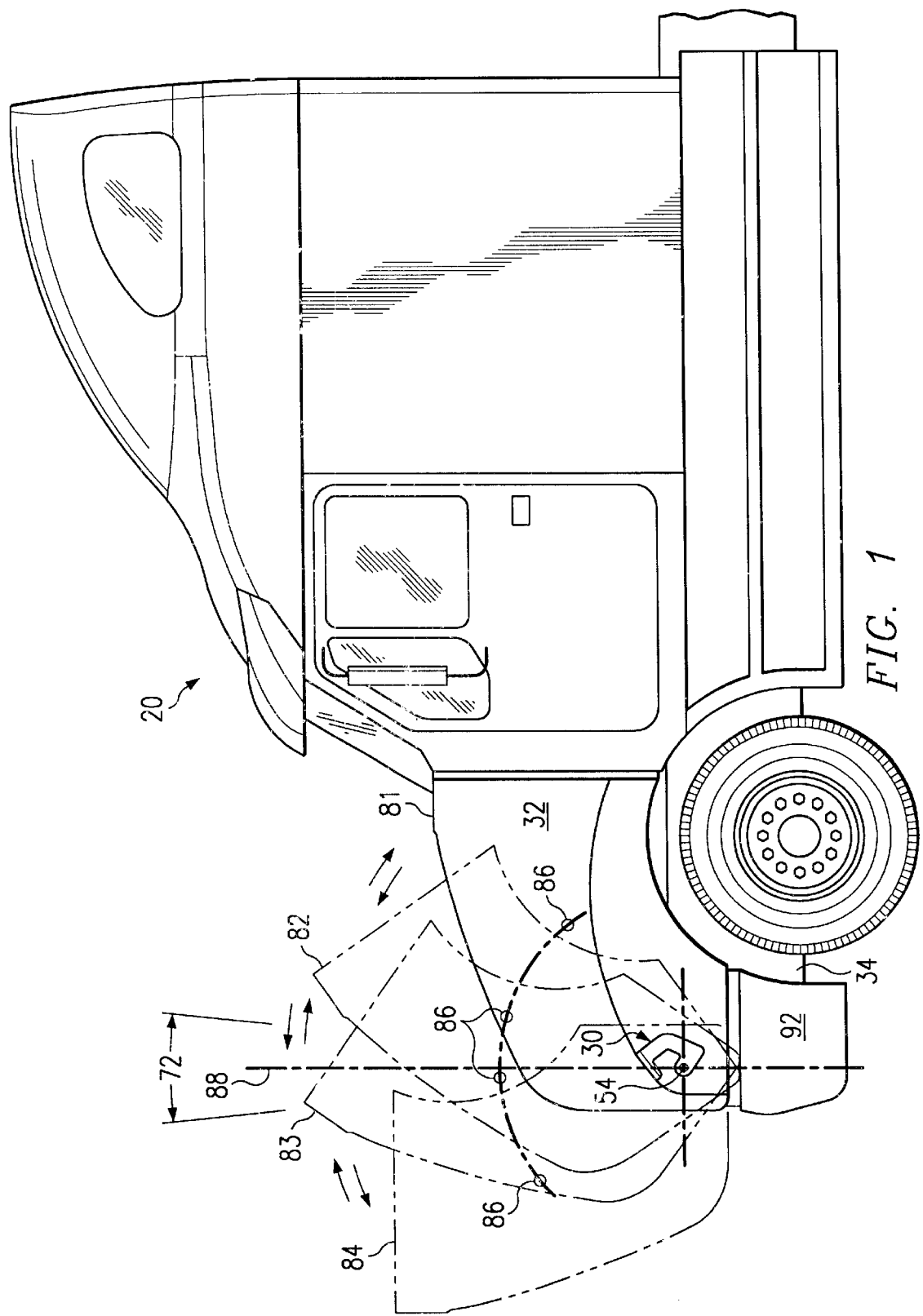

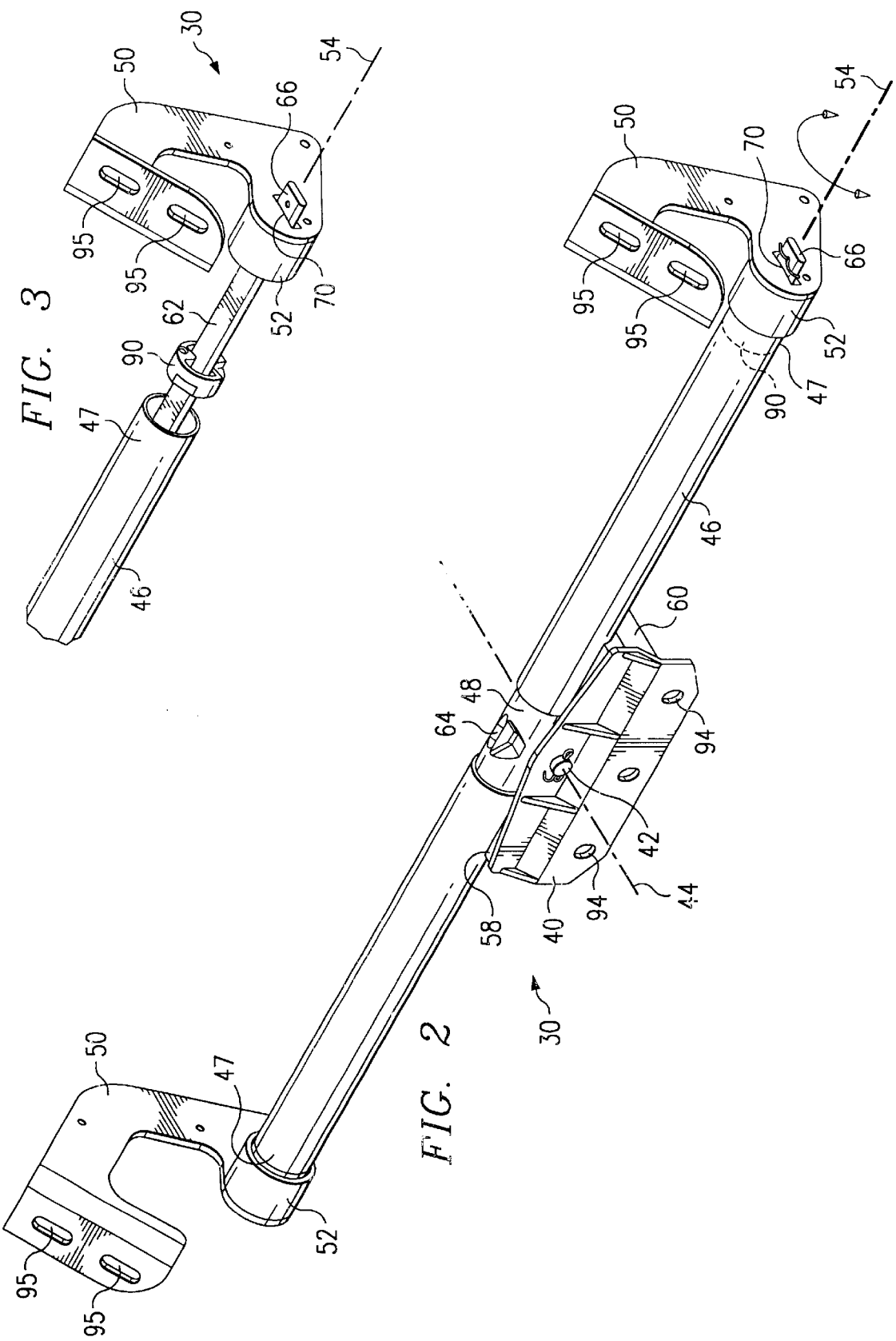

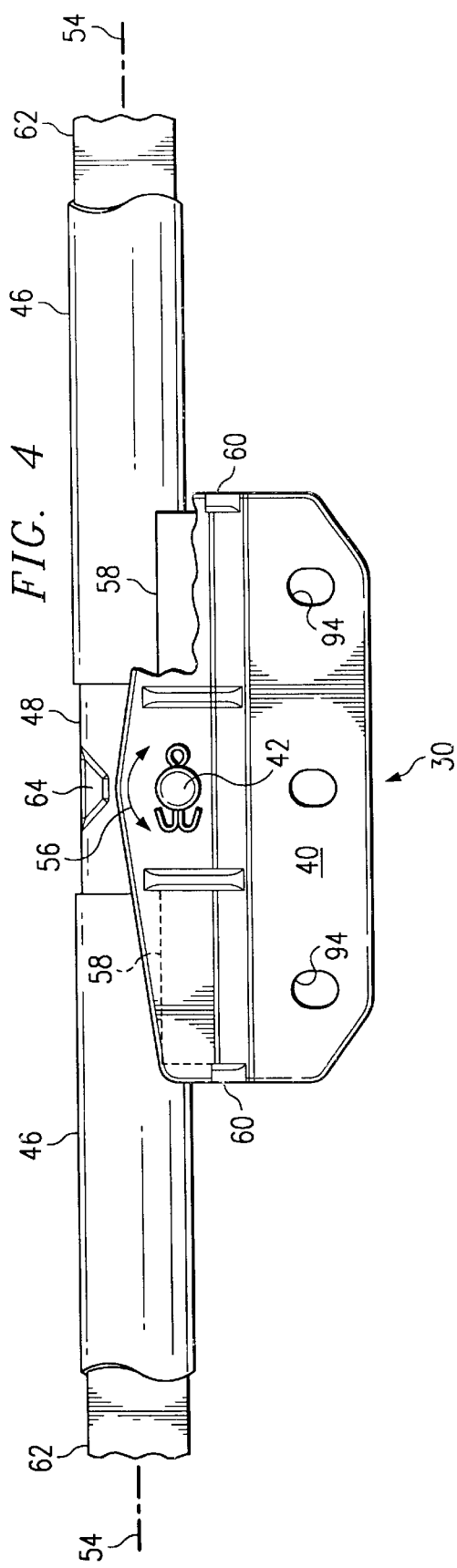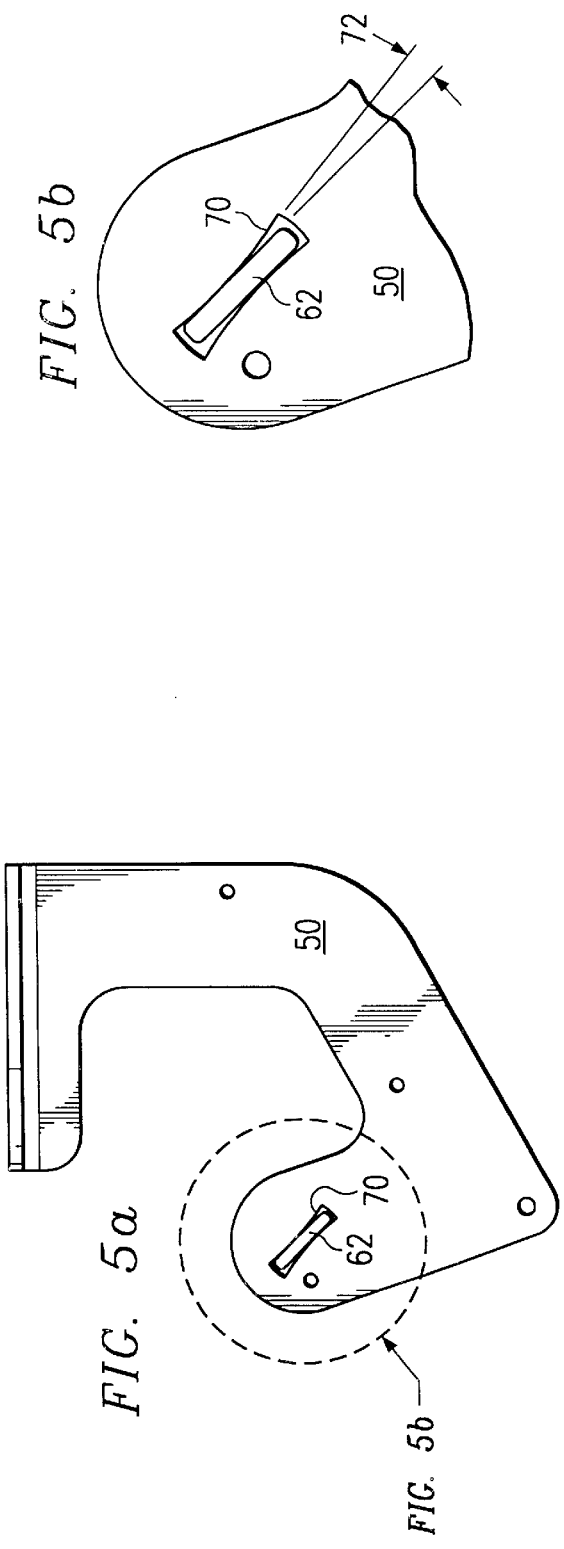

TILT MECHANISM AND METHOD FOR PIVOTING A VEHICLE BODY PANEL RELATIVE TO A VEHICLE CHASSIS

TECHNICAL FIELD OF INVENTION

This present invention relates to a tilt mechanism for use on motor vehicles. In one aspect, it relates to a tilt mechanism for pivoting a vehicle body panel relative to a vehicle chassis. In another aspect, it relates to a method of assisting a pivotal movement of a vehicle body panel relative to a vehicle chassis. In yet another aspect, it relates to a method of installing a vehicle body panel on a vehicle chassis.

BACKGROUND OF INVENTION

Tilt mechanisms for pivoting a vehicle body panel relative to a vehicle chassis are generally known in the fields of automotive engineering and mechanism design. There have been many mechanism designs for such tilt mechanisms over the years since the creation of the automobile and possibly even as far back as the creation of horse-drawn carriages. For example, a common hinge could be used as a tilt mechanism. Also, there have been various tilt mechanism designs that incorporate a spring member to assist the opening or closing of a vehicle body panel.

However, there exists a need for improvements to these tilt mechanism designs for various reasons. For example, conventional hood hinges (e.g., car or truck hood hinges) typically have two connection points that a hood pivots about relative to a vehicle chassis and a latch to fasten the hood in a closed position. Such conventional hood hinges are typically arranged such that there is a hinge on the driver side and another hinge on the passenger side of the vehicle, where each hinge has a pivot axis that is substantially aligned with that of the other hinge. But, because the hood typically covers the engine, the conventional hood hinges may move relative to each other when the vehicle chassis twists due to heavy loading on the engine (e.g., pulling a trailer). Also under cornering loads or other dynamic loads exerted on the vehicle chassis, the chassis may twist, causing the hinges to move relative to each other. Such relative movement between the two hinges may deform the hood. Hence, there is a need for a tilt mechanism that will allow a vehicle chassis to twist under heavy engine loading or under other dynamic loads while also not deforming a vehicle body panel attached thereto.

Another example of a needed improvement to conventional tilt mechanisms for pivoting a vehicle body panel relative to a vehicle chassis is the need for a method of installing large, bulky, and/or heavy body panels on a chassis where the tilt mechanism has a spring member for biasing the body panel relative to the chassis. When a body panel is large, bulky, and/or heavy, it is often desirable to have a spring member associated with the tilt mechanism to assist the pivoting of the body panel. But, installing a tilt mechanism that has a spring member can be quite difficult. The difficulty arises in aligning the tilt mechanism and the body panel for installation on the chassis when the spring member requires a very large force or torque to bias it, especially when the body panel is large, bulky, or heavy.

Yet another example of a needed improvement to conventional tilt mechanisms for pivoting a vehicle body panel relative to a vehicle chassis is the need for an improved tilt restraint design for limiting the pivotal range of the body panel relative to the chassis.

SUMMARY OF INVENTION

Many of the needs outlined above are addressed by the present invention hereof. It is an object of the present invention to provide a tilt mechanism that has a single-point pivot attachment at a pivot pin to allow lateral articulation of the attached body panel about a pivot pin axis relative to the chassis to reduce or eliminate body panel deformation under heavy engine loading or under other dynamic loads that may twist the chassis.

It is another object of the present invention to provide a tilt mechanism having a torsion bar therein adapted for biasing the body panel relative to the chassis, where a vehicle body panel attached to a vehicle chassis via the tilt mechanism can pivot about the tilt mechanism relative to the chassis without loading the torsion bar over a specified angular range about the tilt mechanism, and also the torsion bar can support at least part of the body panel weight over another portion of the pivotal range about the tilt mechanism.

It is yet another object of the present invention to provide a method of installing large, bulky, and/or heavy body panels on a chassis via a tilt mechanism without loading a torsion bar within the tilt mechanism over a tolerance range of installation angles, where the torsion bar is adapted for biasing the body panel relative to the chassis.

Still another object of the present invention is to provide a tilt restraint located within the tilt mechanism for providing at least one limit on the pivotal range of the tilt mechanism.

In accordance with one aspect of the present invention, a tilt mechanism for pivoting a vehicle body panel relative to a vehicle chassis comprises a chassis bracket, a pivot pin, a support member, compliant members, hard stops, a torsion bar, hour-glass-shaped slots, pivot brackets, bearings, and a tilt restraint.

The chassis bracket is adapted for attaching to the chassis, and pivot brackets are adapted for attaching to the body panel. Hence, the body panel can be attached to the chassis via the tilt mechanism. The pivot pin is supported by and extends through the chassis bracket along a pivot pin axis of the pivot pin. The chassis bracket has a clevis structure for receiving the pivot pin. The pivot pin is adapted for supporting at least part of a vehicle body panel weight. Also, the pivot pin is adapted for providing a single-point pivot attachment of the body panel to the chassis such that the body panel can articulate about the pivot pin axis relative to the chassis. The support member pivotably connects to the chassis bracket about the pivot pin axis and within the clevis structure of the chassis bracket at a support member midpoint by the pivot pin. The support member has a tilt axis along a longitudinal extent of the support member. The support member is also adapted for supporting at least part of the body panel weight.

The compliant members are proximate to the pivot pin within the clevis structure and are attached to the chassis bracket. The compliant members are adapted for urging a substantially parallel position of the support member relative to the chassis about the pivot pin because the members are prestressed and in contact with the support member when the support member is not being pivoted about the pivot pin. The hard stops are formed on the chassis bracket for limiting a support member pivotal range of the support member about the pivot pin.

The flat rectangular-shaped torsion bar is within the support member and secured to the support member midpoint at a torsion bar midpoint. The torsion bar has a twist axis along a longitudinal extent of the torsion bar that is generally perpendicular to the pivot pin axis and substantially axially aligned with the tilt axis. The torsion bar is adapted for biasing the body panel relative to the chassis along at least an angular portion of a pivotal range about the tilt axis. Each end of the torsion bar forms a key pin.

Hour-glass-shaped slots are formed in the pivot brackets. The slots are adapted for receiving the key pins such that the pivot brackets can pivot about the tilt axis relative to the chassis bracket without loading the torsion bar over a specified angular range. Two bearings, one fixed to each of the pivot brackets, have a bearing rotation axis substantially axially aligned with the tilt axis. Each of the bearings forms a socket for receiving each end of the support member. The bearings are adapted for transferring at least part of the body panel weight from the pivot brackets to the support member while also allowing the pivot brackets to pivot about the tilt axis relative to the support member.

The tilt restraint is adapted for providing a limit on a pivot bracket rotational range of the pivot bracket about the tilt axis. The tilt restraint is located within and fixed to the support member. The tilt restraint is axially located along the tilt axis proximate to one of the ends of the support member. The tilt restraint is adapted for abutting with a surface of the torsion bar at the limit to hinder further pivoting about the tilt axis.

Important elements of the present invention are the support member, the pivot pin, the torsion bar, the hour-glass-shaped slots, and the tilt restraint. All possible embodiments will incorporate the support member. Other embodiments of the present invention may comprise various combinations of the primary elements added to the support member. For example, one embodiment may have the tilt mechanism with all of the primary elements except for the torsion bar, the hour-glass-shaped slots, and the tilt restraint, which would be a tilt mechanism with single-point pivot attachment that allows lateral articulation about the pivot pin. Another embodiment may have, for example, the tilt mechanism with all of the primary elements except for the hour-glass-shaped slots and the tilt restraint, which would be a tilt mechanism with a single-point pivot attachment and a torsion bar to bias against a moment created by the body panel weight for assisting the opening and closing of the body panel.

In accordance with a further aspect of the present invention, a method of assisting a pivotal movement of a vehicle body panel relative to a vehicle chassis comprises the steps of, first, supporting at least a portion of a vehicle body panel weight with a first torsional force stored in a torsion bar within a tilt mechanism that attaches the body panel to the chassis when the body panel is in a first position. The second step is to pivot the body panel about a tilt axis of a tilt mechanism relative to the chassis from the first position to a second position while supporting at least a portion of the body panel weight with the first torsional force stored in the torsion bar. The third step is unloading the torsion bar at the second position, and pivoting the body panel about the tilt axis relative to the chassis from the second position to a third position without loading the torsion bar. At the third position, the body panel weight begins to load the torsion bar again, but in the opposite direction. The fourth step is pivoting the body panel about the tilt axis relative to the chassis from the third position to a fourth position while supporting at least a portion of the body panel weight with a second torsional force generated in the torsion bar as the body panel pivots about the tilt axis from the third position to the fourth position. Hence, the first torsional force has a first rotational direction about the tilt axis that is opposite of a second rotational direction of the second torsional force about the tilt axis. The final step is supporting at least a portion of the body panel weight with the second torsional force stored in the torsion bar when the body panel is in the fourth position. In another embodiment, this method can be reversed by going from the fourth position to a first position. The first position may be a closed position of a truck hood relative to a truck chassis. Correspondingly, the fourth position may be a fully open position of the truck hood relative to the truck chassis.

In accordance with another aspect of the present invention, a method of installing a vehicle body panel on a vehicle chassis comprises the steps of, first, supporting at least a portion of a vehicle body panel weight while positioning the body panel at an installation angle and positioning a tilt mechanism at the installation angle. The tilt mechanism is adapted to pivotably attach the body panel to the chassis, and it has a torsion bar adapted to bias the body panel relative to the chassis about a twist axis of the torsion bar along at least an angular portion of a pivotal range about a tilt axis. The second step is compensating for a lack of angular alignment about the tilt axis between the body panel and the chassis by having the installation angle within a dead band about the tilt axis. The dead band is a specified angular range of the pivotal range about the tilt axis where the torsion bar is unloaded when the body panel is attached to the chassis and pivoting about the tilt axis within the specified angular range. The third step is attaching the body panel to the chassis via the tilt mechanism without loading the torsion bar by having the installation angle within the deadband.

BRIEF DESCRIPTION OF DRAWINGS

Other objects and advantages of the invention will become apparent upon reading the following detailed description and upon reference to the accompanying drawings in which:

FIG. 1 is a side view of a truck having an embodiment of the present invention installed thereupon;

FIG. 2 is an isometric view of a tilt mechanism according to the embodiment shown in FIG. 1;

FIG. 3 is an isometric view, with portions broken away for illustration, of the embodiment shown in FIG. 2;

FIG. 4 is a front view, with portions broken away for illustration, of the tilt mechanism shown in FIG. 2;

FIG. 5a is a side view of the pivot bracket of the embodiment shown in FIGS. 1–3;

FIG. 5b is a detailed view of a portion of the pivot bracket shown in FIG. 5a;

FIG. 8b is a cross-sectional view taken along line 8b—8b of the alternative embodiment of the present invention shown in FIG. 8a;

DETAILED DESCRIPTION OF INVENTION

Figure 6:
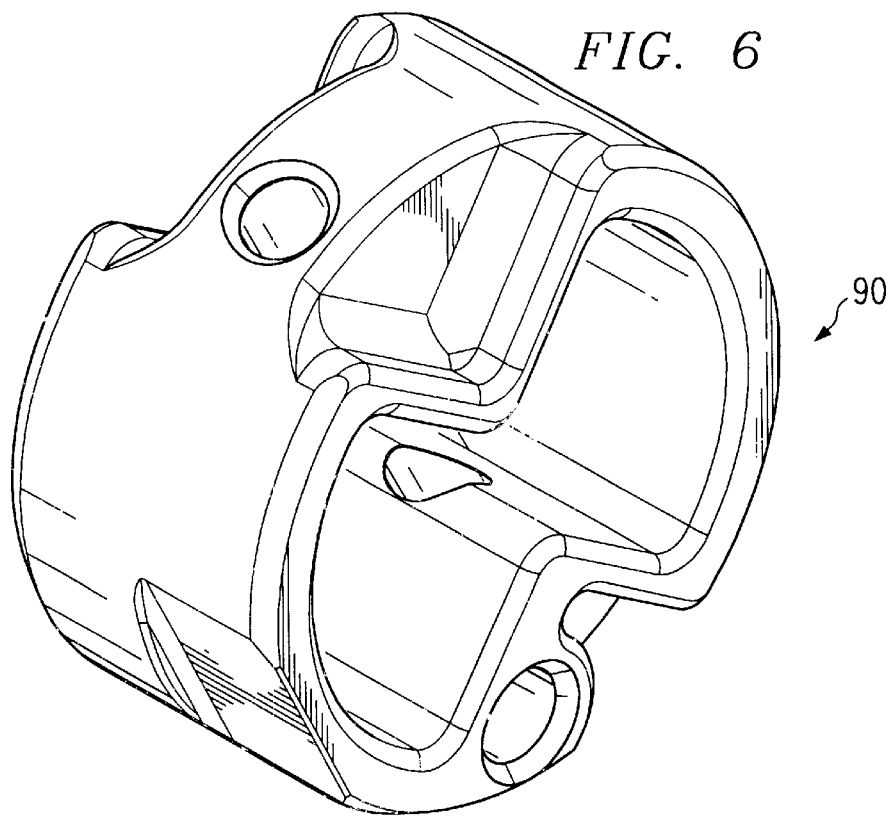
FIG. 6 is an isometric view of the tilt insert of the embodiment shown in FIGS. 1–3.

Referring now to the drawings, wherein like reference numbers are used to designate like elements throughout the various views of a first embodiment of the present invention, the first embodiment as well as other possible embodiments and modifications are further described. FIG. 1 shows a truck 20 with a tilt mechanism 30 according to the first embodiment of the present invention. The tilt mechanism 30 attaches a vehicle body panel 32 (truck hood in FIG. 1) to a vehicle chassis 34 (truck chassis in FIG. 1) at the front of the truck hood. A hood latch (not shown) on the rear of the truck hood retains the hood in a closed position relative to the truck chassis. The tilt mechanism 30 allows the body panel 32 to pivot relative to the chassis 34 to provide, for example, opening and closing movements. The tilt mechanism 30 has a torsion bar to assist such opening and closing movement at various angular positions. The tilt mechanism further provides a single-point pivot attachment to allow the hood to laterally articulate about the tilt mechanism. Such articulation can substantially reduce or eliminate torquing of the hood when the chassis twists under heavy engine loads, cornering loads, or other dynamic loading. Also, the single-point pivot reduces the amount of vibrations translated from the chassis into the hood.

FIGS. 2 and 3 show the tilt mechanism 30 of the first embodiment from FIG. 1. The tilt mechanism 30 has a chassis bracket 40 for attaching the tilt mechanism to the chassis 34 via attachment points 94. A pivot pin 42 extends through the chassis bracket 40 and has a pivot pin axis 44. The chassis bracket 40 has a clevis structure for receiving and supporting the pivot pin 42, which may be designed to support the body panel weight. A support member 46 is pivotably connected to the chassis bracket 40 by the pivot pin 42 at a support member midpoint 48 for pivotal articulation about the pivot pin axis 44. The support member 46 provides support for the body panel weight, which is further transferred to the chassis 34 via the pivot pin 42. The support member 46 has a tilt axis 54 that the body panel 32 pivots about relative to the chassis 34. The tilt axis 54 is generally perpendicular to the pivot pin axis 44, and preferably intersecting each other.

The tilt mechanism 30 has pivot brackets 50 for attaching the tilt mechanism 30 to the body panel 32 via attachment points 95. As shown in FIG. 3, a bearing 52 is fixed to each of the pivot brackets 50. The bearings 52 have a bearing pivot axis that substantially aligns with the tilt axis 54. Each bearing forms a socket that receives each support member end 47. The bearings 52 transfer the body panel weight from the pivot brackets 50 to the support member 46 while also allowing the pivot brackets, and hence the attached body panel 32, to pivot about the tilt axis 54 relative to the support member 46 and the chassis 34.

An important aspect of the present invention is that the tilt mechanism 30 can provide a single-point pivot attachment to allow lateral articulation (as indicated by reference arrow 56 in FIG. 4) of the body panel 32 about the pivot pin axis 44 relative to the chassis 34. FIG. 4 shows a portion of the tilt mechanism 30 according to the first embodiment. Also shown in FIG. 4, compliant members 58 are proximate to the pivot pin 42 within the clevis structure and attached to the chassis bracket 40. The compliant members 58 are pre-stressed and in contact with the support member 46 when the support member is not being pivoted about the pivot pin 42. The compliant members 58 urge the support member 46 to be substantially parallel with the chassis bracket 40, but still allow the support member 46 to articulate about the pivot pin axis 44 relative to the chassis bracket 40. Hence, the attached body panel 32 is urged to be substantially parallel to the chassis 34 when there is no articulation about the pivot pin axis 44. The compliant members 58 may also absorb vibrations, depending on the choice of material used, to reduce the amount of vibrations translated from the chassis 34 to the body panel 32. Also shown in FIG. 4 are hard stops 60 formed on the chassis bracket 40. The hard stops 60 limit the pivotal range of the support member 46 about the pivot pin axis 44.

Referring again to FIG. 3, a flat rectangular-shaped torsion bar 62 is within the support member 46 and secured to the support member midpoint 48 at a torsion bar midpoint 64. The torsion bar 62 has a twist axis along a longitudinal extent of the torsion bar that is substantially axially aligned with the tilt axis 54. The torsion bar 62 can bias the pivot brackets 50 relative to the chassis bracket 40 when the pivot brackets are rotated about the tilt axis 54 along certain angular portion of a pivotal range about the tilt axis. Thus, the torsion bar 62 can bias an attached body panel 32 relative to the chassis 34 when the tilt mechanism 30 is used to secure the body panel to the chassis as shown in FIG. 1.

Each torsion bar end 66 forms a key pin (see FIGS. 2 and 3). As shown in FIG. 5a, an hour-glass-shaped slot 70 is formed in each pivot bracket 50. FIG. 5b is an enlarged detail view of the slot 70 from FIGS. 3 and 5a with the torsion bar 62 inserted therein. The slot 70 receives the key pin of the torsion bar end 66 such that the pivot bracket 50 can pivot about the tilt axis 54 relative to the chassis bracket 40 without loading the torsion bar 62 over a specified angular range (as indicated by reference number 72 in FIGS. 1 and 5b) to create a dead band. The specified angular range 72 is determined by the shape of the slot 70. Hence there can be various specified angular ranges 72 suited for different applications by changing the shape of the slot 70. Also, the angular orientation of the slot 70 determines the angular position about the tilt axis 54 where the dead band will be located, which can also vary for different application needs.

Another important aspect of the present invention is that the torsion bar 62 can assist in the pivotal movement of the body panel 32 relative to the chassis 34 over part of the pivotal range about the tilt axis 54, and also the body panel 32 can pivot relative to the chassis 34 over another part of the pivotal range (i.e., specified angular range 72) without loading the torsion bar 62. FIG. 1 illustrates this important aspect by showing the steps of a truck hood 32 (body panel) as it moves from a first position 81 (fully closed) to a fourth position 84 (fully open). In the first position 81, at least a portion of the body panel weight is supported by a first torsional force stored in the torsion bar 62 due to the twisted configuration of the torsion bar at the first position. As the body panel 32 is lifted from the first position 81 to a second position (indicated by phantom lines 82) by pivoting the body panel 32 about the tilt axis 54 relative to the chassis 34, the first torsional force assists such movement by supporting at least a portion of the body panel weight. Also, as the body panel 32 is moved from the first position 81 to the second position 82, the torsion bar 62 is being untwisted, thereby decreasing the magnitude of the first torsional force as the second position is approached. Thus, at the second position 82 the torsion bar 62 is untwisted, and hence unloaded. At the second position 82 the entire body panel weight is supported by the support member 46, which is supported by the pivot pin 42. As the body panel 32 is pivoted about the tilt axis 54 from the second position 82 to a third position (indicated by phantom lines 83) the torsion bar 62 is not loaded (not twisted) because the hour-glass shape of the slot 70 (see FIG. 5b) allows the torsion bar to rotate within the slot without twisting the torsion bar over the specified angular range 72. The specified angular range 72 is defined by the shape of the slot 70. The angular location about the tilt axis 54 of this dead band between the second 82 and third 83 positions is determined by the orientation of the slot 70. Hence, the second 82 and third 83 positions are determined by the angular orientation of the slot 70 about the tilt axis 54 and the shape of the slot (i.e., the specified angular range 72). As the body panel 32 continues to pivot about the tilt axis 54 relative to the chassis 34, the torsion bar 62 begins to be twisted in an opposite direction about the twist axis at the third position 83 because the edge of the slot 70 begins to abut another surface of the torsion bar, which twists the torsion bar. As the body panel 32 pivots from the third position 83 to a fourth position (indicated by phantom lines 84), a second torsional force is generated by the twisting of the torsion bar 62. The second torsional force is directed in an opposite direction about the tilt axis 54 relative to the first torsional force because the torsion bar 62 is being twisted in the opposite direction. The magnitude of the second torsional force increases as the fourth position 84 is approached. Hence, the second torsional force stored within the torsion bar 62 supports an increasing amount of the body panel weight as the fourth position 84 is approached.

In the application shown in FIG. 1, the body panel 32 is attached to the tilt mechanism 30 away from the center of gravity 86 of the body panel. Thus, when the body panel 32 is in the first 81 and fourth 84 positions there is a much larger moment about the tilt axis 54 due to the body panel weight than when the body panel 32 is at the second 82 and third 83 positions. Between the second 82 and third 83 positions there is little or no moment due to the body panel weight because the center of gravity 86 is near or at a vertical plane 88 projecting through the tilt axis 54. A unique feature of the present invention is that the assisting torque generated in the torsion bar 62 can increase as the moment due to the body panel weight increases in both pivot directions. Yet a dead band (i.e., specified angular range 72) where there is no torque assistance still can be located where the assisting torque is less needed (i.e., between the second 82 and third 83 positions). This dead band can be helpful for installing the tilt mechanism 30, as next described.

In some applications of the present invention, the force required to bias the torsion bar 62 may be very large if the tilt mechanism 30 is designed to assist the pivoting of a heavy body panel 32 that has a center of gravity 86 displaced away from the tilt axis 54, which thereby enables large moments about the tilt axis 54 due to the body panel weight. In such applications, it is desirable to have the torsion bar 62 in an untorqued configuration while installing the body panel 32 on the chassis 34 via the tilt mechanism 30. Without a dead band where torsion bar 62 will not be engaged, the desirable installation angle (where the torsion bar is not biased) would be limited to a single angle about the tilt axis 54. With only a single desirable installation angle, it may be more difficult to accurately align the body panel 32 and tilt mechanism 30 relative to the chassis 34 at that angle, especially when the body panel 32 is large, bulky, and/or heavy. Thus, having a dead band created by an hour-glass-shaped slot 70 provides a specified angular range 72 where the body panel 32 can be installed without torquing the torsion bar 62, as described in the following method.

Yet another important aspect of the present invention is a method of installing the vehicle body panel 32 on the vehicle chassis 34 over a tolerance range of installation angles without loading the torsion bar 62. First, the body panel 32 is supported and positioned at an installation angle. The installation angle can be any angular position about the tilt axis 54 within the specified angular range 72 (dead band). Within this specified angular range 72, the torsion bar 62 is unloaded. As shown in FIG. 1, the dead band is the specified angular range 72 between the second and third positions 82 and 83. Hence, the installation angle should be somewhere between the second and third positions 82 and 83 to achieve the desirable installation angle where the torsion bar 62 is unloaded. Second, the body panel is attached to the chassis via the tilt mechanism at an installation angle within the dead band.

The order of installing the tilt mechanism 30 and body panel 32 on the chassis 34 for the second step can vary. For example, the tilt mechanism 30 may be installed on the body panel 32 first, followed by installing the tilt mechanism and body panel combination on the chassis 34. Or, the tilt mechanism 30 may be installed on the chassis 34 first, followed by installing the body panel 32 on the tilt mechanism. Or, the support member and pivot bracket portions of the tilt mechanism 30 (disconnected from the remainder of the tilt mechanism at the pivot pin 42) may be installed on the body panel 32 first, followed by installing the chassis bracket portion on the chassis 34, and then installing the body panel on the chassis via the tilt mechanism 30 by inserting the pivot pin 42. For each possible installation order in a given application, there is still the same desired installation angle where the torsion bar 62 will not be torqued at the final stage of installation. Thus, by utilizing the tilt mechanism 30 according to the first embodiment of the present invention, the tilt mechanism and/or body panel 32 can be installed on the chassis 34 without loading the torsion bar 62 at a number of installation angles within the specified angular range 72. Installing the tilt mechanism 30 and/or body panel 32 without loading the torsion bar 62 makes it much easier to line up the attachment points 94 of the chassis bracket 40 (e.g., placing a bolt or screw through the chassis bracket into the chassis 34) or to line up the attachment points 95 of the pivot bracket 50 (e.g., placing a bolt or screw through the pivot bracket into the body panel 32) or to line up the pivot pin 42 with the chassis bracket 40. Therefore, the dead band compensates for a lack of angular alignment about the tilt axis 54 between the tilt mechanism 30, body panel 32, and the chassis 34, and the dead band creates a tolerance range for the installation angle.

Still another important aspect of the present invention is that a tilt restraint 90 is located within the support member 46 for providing at least one limit on the pivotal range of the pivot bracket 50 about the tilt axis 54. For example (referring again to FIG. 1), the tilt restraint 90 may define the first position 81 and/or fourth position 84, thereby limiting the pivot range of the body panel 32. The tilt restraint 90 in FIG. 1 may prevent the truck hood 32 from opening too far, which could prevent damage to the torsion bar 62 or could prevent the truck hood from hitting the truck bumper 92 or the ground. FIG. 3 shows the tilt restraint 90, which is not visible without a broken away view because it is fixed within the support member 46. The torsion bar 62 protrudes through the tilt restraint 90. The tilt restraint 90 is fixed inside the support member 46, and it is axially located along the tilt axis 54 proximate to one of the support member ends 47. There may be two tilt restraints, one on each side.

Figure 7:
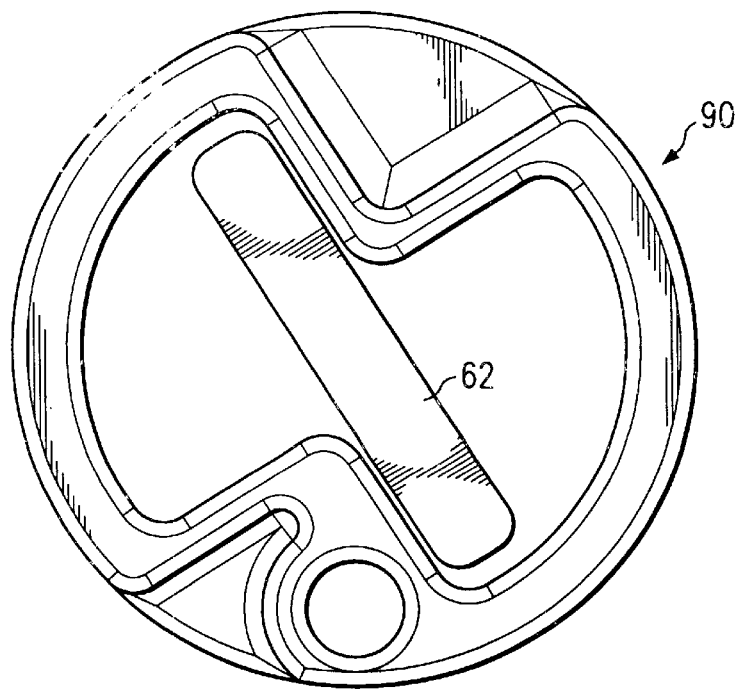
FIG. 7 is an end view of the tilt insert shown in FIG. 6.
Figure 8A:
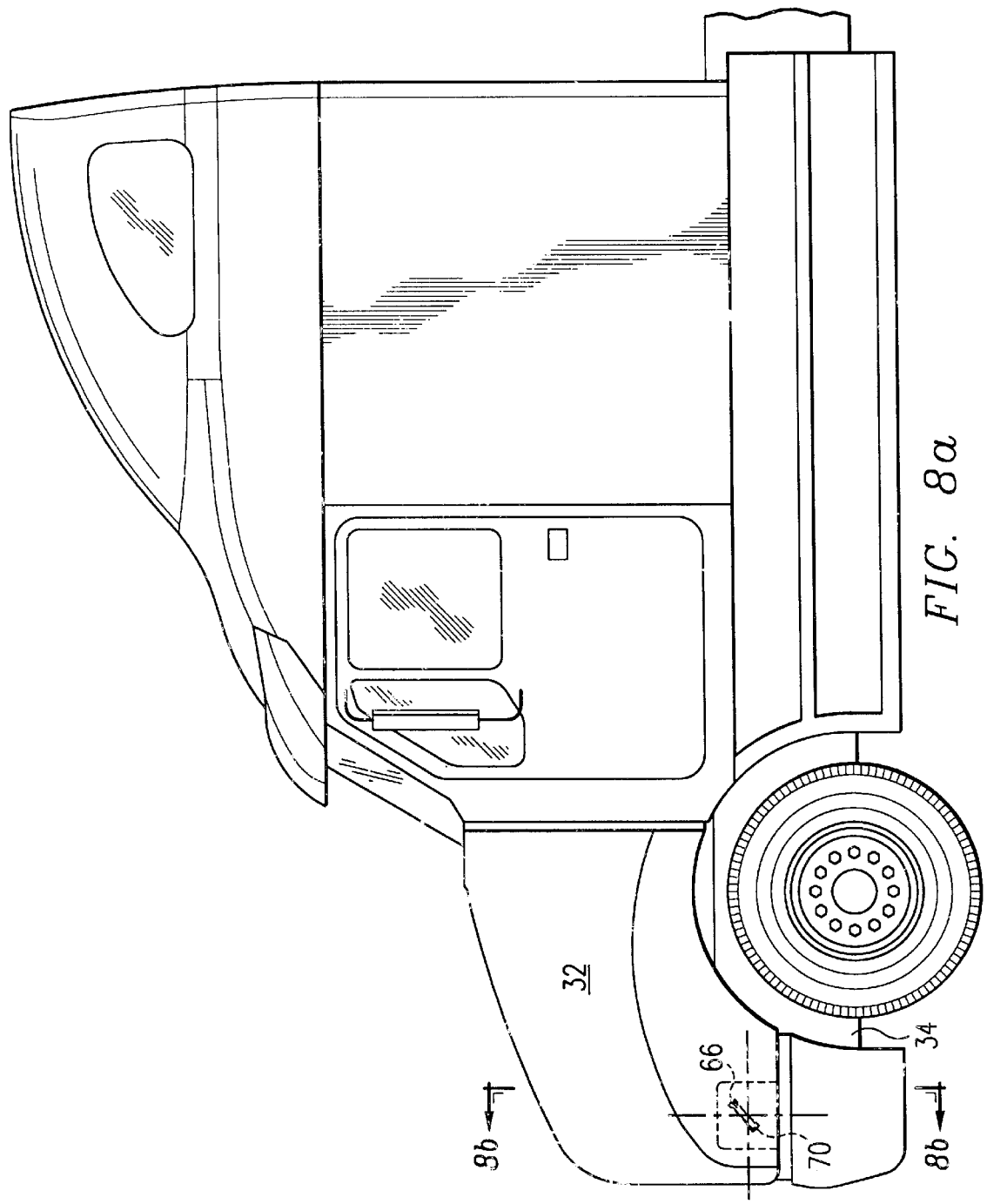
FIG. 8a is a side view of a truck having an alternative embodiment of the present invention installed thereupon.
Figure 8B:
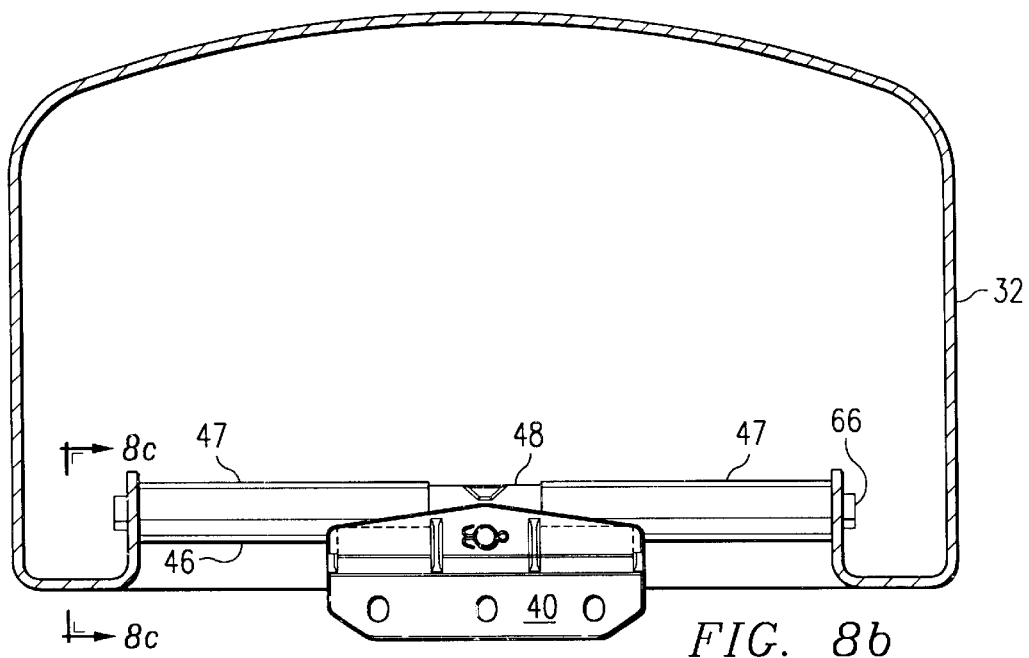
Figure 8C:
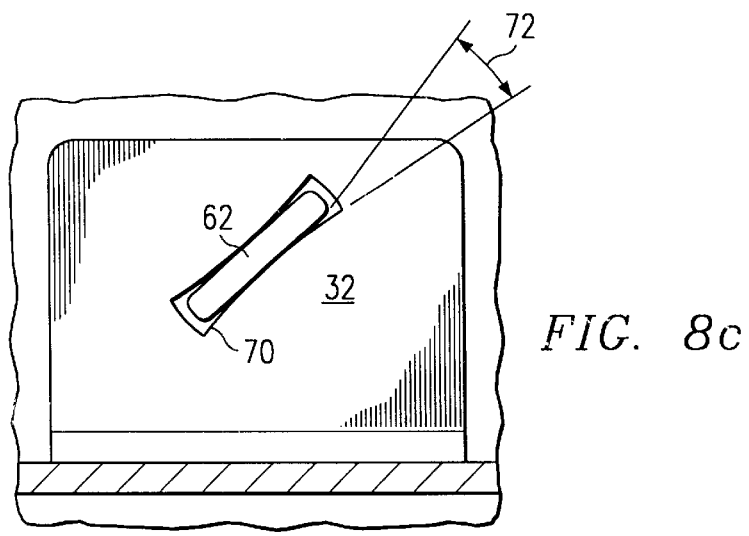
FIG. 8c is a cross-sectional view taken along line 8c—8c of the alternative embodiment of the present invention shown in FIG. 8b.
Figure 10:
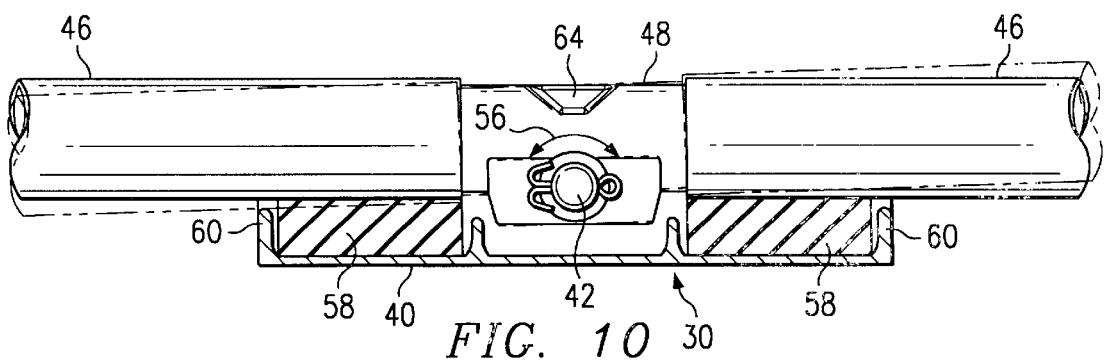
FIG. 10 is a front view of the tilt mechanism shown in FIG. 2, with portions broken away for illustration of the hard stops and the compliant members.
Figure 9:
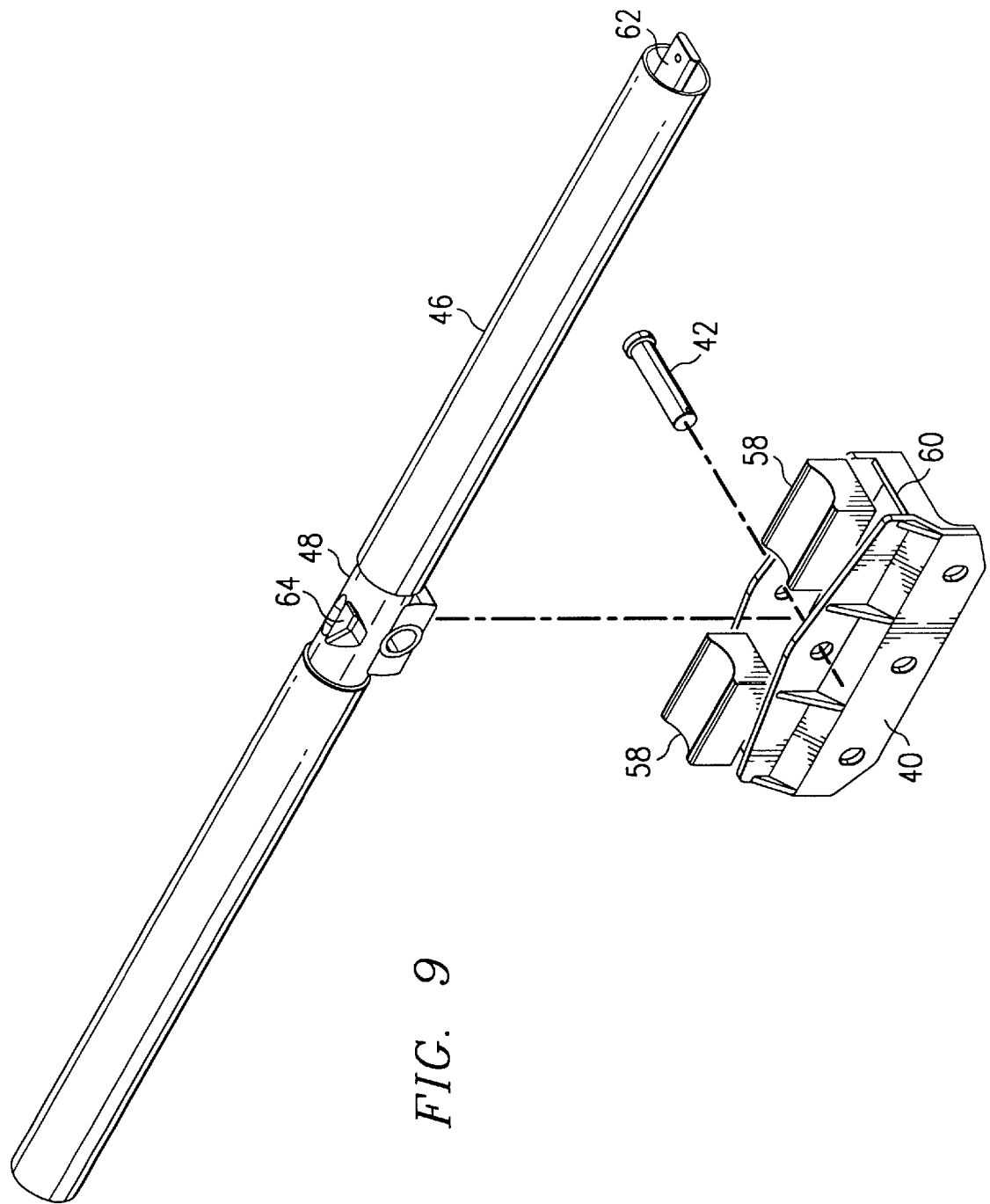
FIG. 9 is an exploded isometric view of the tilt mechanism shown in FIG. 2.

FIGS. 6 and 7 show in more detail the tilt restraint 90 of the embodiment of FIGS. 1–3. FIG. 6 is an isometric view showing the general geometric configuration of the tilt restraint 90. FIG. 7 is an end view of the tilt restraint 90 having the torsion bar 62 passing through it. When the torsion bar 62 rotates to an angular position about the twist axis where it interfaces with the tilt restraint 90 (see FIG. 7), the tilt restraint hinders further twisting and rotation of the torsion bar. Because the tilt restraint 90 is located proximate to the support member end 47, it is also generally proximate to the pivot bracket slot 70. Hence, when the torsion bar 62 being twisted by a torque applied at the pivot bracket slot 70 abuts the tilt restraint 90, further twisting of the torsion bar is substantially hindered by the tilt restraint due to the close axial proximity of the tilt restraint and the pivot bracket slot. Thus, the angular orientation of the tilt restraint 90 about the tilt axis 54 determines the angular location of a pivot range limit of the body panel 32 about the twist axis 54 (e.g., first position 81 and/or fourth position 84 in FIG. 1).

Another embodiment of the present invention may have a tilt mechanism 30 for pivotably securing a vehicle body panel 32 to a vehicle chassis 34 such that the tilt mechanism described above in the first embodiment does not have a chassis bracket 40 and/or pivot brackets 50. The vehicle chassis 34 may be adapted to receive and support the pivot pin 42 (e.g., a clevis structure formed in the chassis), or the vehicle body panel 32 may be adapted to receive and secure the torsion bar 62 and the support member 46. In other words, the chassis bracket 40 may be integrally formed, welded, or otherwise permanently bonded on the vehicle chassis 34. Likewise, the pivot brackets 50 may be integrally formed, welded, or otherwise permanently bonded on the vehicle body panel 32.

Other embodiments of the present invention may comprise various combinations of the primary elements of the invention. For example, an embodiment may comprise an hour-glass-shaped slot 70 formed in the body panel 32 or in a pivot bracket 50, a torsion bar 62, and a support member 46, but not having a single-point pivot attachment (pivot pin 42) nor a tilt restraint 90 within the support member. Another embodiment may comprise a support member 46, a torsion bar 62, and a tilt restraint 90 within the support member, but not having a single-point pivot attachment (pivot pin 42) nor a hour-glass-shaped slot 70. Yet another embodiment may comprise a single-point pivot attachment (pivot pin 42) and a support member 46, but not having a torsion bar 62, a tilt restraint 90 within the support member, nor an hour-glass-shaped slot 70. Of course, this embodiment would not have the compensation moment of the torsion bar. Still another embodiment may comprise a single-point pivot attachment (pivot pin 42), a support member 46, a torsion bar 62, and an hour-glass-shaped slot 70 formed in the body panel 32 or in a pivot bracket 50, but not having a tilt restraint 90 within the support member. A further embodiment may comprise a support member 46, a torsion bar 62, an hour-glass-shaped slot 70 formed in the body panel 32 or in a pivot bracket 50, and a tilt restraint 90 within the support member, but not having a single-point pivot attachment divot pin 42). A still further embodiment may comprise a support member 46, a torsion bar 62, and a single-point pivot attachment (pivot pin 42), but not an hour-glass-shaped slot 70 nor a tilt restraint 90 within the support member. Another embodiment may comprise a support member 46, a torsion bar 62, a single-point pivot attachment (pivot pin 42), and a tilt restraint 90 within the support member, but not an hour-glass-shaped slot 70. Yet another embodiment may comprise a support member 46 and a torsion bar 62, but not a single-point pivot attachment (pivot pin 42), a tilt restraint 90 within the support member, nor an hour-glass-shaped slot 70. An embodiment without an hour-glass-shaped slot 70 may have instead a simple linear slot formed in the body panel 32 or in a pivot bracket 50 to secure the torsion bar end 66, and thus no dead band.

Also, any of the embodiments described above may have more variations. For example, an embodiment may or may not have the compliant members 58 and/or the hard stops 60 (see FIG. 4). The compliant members 58 can be made from various materials, including but not limited to: rubber, urethane, plastic, and silicon. The structural components of the tilt mechanism (e.g., chassis bracket 40, pivot pin 42, support member 46, pivot bracket 50, bearing 52, and/or tilt restraint 90) can be made from various materials, including but not limited to: steel, aluminum, titanium, or carbon-fiber composites. The torsion bar 62 can be made from various materials, including but not limited to: steel, aluminum, titanium, fiberglass composites, graphite composites, carbon-fiber composites, kevlar composites, nylon composites, or rubber. Also, the torsion bar 62 may have various shapes and configurations other than the rectangular shape shown, including but not limited to a: solid round bar, hollow round tubing, solid bar with a square cross-section, hollow bar with a octagonal cross-section, or hollow bar with an oval cross-section. Similarly, the support member 46 may have various shapes and configurations with a generally polygonal cross-section, other than the hollow round tubular shape shown, and being hollow, filled, or solid. The tilt restraint 90 may have various shapes to provide corresponding various pivot range limits for the body panel 32 about the twist axis 54. The tilt axis 54 of the tilt mechanism 30 may or may not be perpendicular to the pivot pin axis 44. An embodiment may or may not incorporate a bearing 52 at the pivotal connection between the support member 46 and the body panel 32 or the pivot bracket 50. The bearing 52 is not essential to the function of the tilt mechanism 30, but it can allow the tilt mechanism to pivot easier about the tilt axis 54 and prolong the number of pivotal cycles for the tilt mechanism 30.

Furthermore, an embodiment of the present invention may be one-sided. In other words, an embodiment may have only one pivot bracket. A support member may be pivotably attached to a pivot pin at a proximate support member end, and pivotably attached to the pivot bracket at a distal support member end. A torsion bar within the support member may be secured to the proximate support member end at a proximate torsion bar end, and secured to the pivot bracket by a distal torsion bar end at the distal support member end. Hence in such one-sided embodiment, there is one pivot bracket at a distal end of the tilt mechanism, and one chassis bracket and pivot pin at a proximate end of the tilt mechanism. In addition, two separate one-sided embodiments may be used, for example, one on each side.

It will be appreciated by those skilled in the art having the benefit of this disclosure that this invention provides a tilt mechanism for pivoting a vehicle body panel relative to a vehicle chassis, as well as a method of assisting a pivotal movement of a vehicle body panel relative to a vehicle chassis and a method of installing a vehicle body panel on a vehicle chassis without loading a torsion bar within the tilt mechanism. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

The claimed invention is:

1. A tilt mechanism for pivoting a vehicle body panel relative to a vehicle chassis, comprising:
   a support member having a tilt axis along a longitudinal extent of said support member, said support member having a support member end, said support member end being adapted to pivotably connect to said body panel such that said body panel can pivot about said tilt axis relative to said support member, and said support member being adapted to support at least part of a vehicle body panel weight; and
   a pivot pin having a pivot pin axis along a longitudinal extent of said pivot pin, said support member being adapted to pivotably attach to said chassis about said pivot pin axis by said pivot pin, said tilt axis being generally perpendicular to said pivot pin axis, said pivot pin being adapted to support said at least part of said vehicle body panel weight, and said pivot pin being adapted to provide a single-point pivot attachment of said body panel to said chassis such that said body panel can articulate about said pivot pin axis relative to said chassis.

2. A tilt mechanism in accordance with claim 1, further comprising:
   a torsion bar within said support member, said torsion bar being secured to said support member at one portion of said torsion bar, said torsion bar being adapted to secure to said body panel at a torsion bar end, said torsion bar having a twist axis along a longitudinal extent of said torsion bar, said twist axis being substantially axially aligned with said tilt axis, and said torsion bar being adapted to bias said body panel relative to said chassis about said twist axis along at least an angular portion of a pivotal range about said tilt axis.

3. A tilt mechanism in accordance with claim 2, wherein said torsion bar end is adapted to be seated in an hour-glass-shaped slot formed in said body panel such that said body panel can pivot about said twist axis relative to said chassis without loading said torsion bar over a specified angular range about said tilt axis.

4. A tilt mechanism in accordance with claim 2, further comprising:
   a tilt restraint adapted to provide a limit on said pivotal range about said tilt axis, said tilt restraint being located within and fixed to said support member, said tilt restraint being axially located along said tilt axis proximate to said support member end, and said tilt restraint being adapted to abut with a surface of said torsion bar at said limit to hinder further pivoting about said tilt axis.

5. A tilt mechanism in accordance with claim 1, further comprising:
   a pivot bracket, said pivot bracket being adapted to pivotably connect said support member end to said body panel, said pivot bracket being adapted to attach to said body panel; and
   a bearing attached to said pivot bracket where said support member end attaches to said pivot bracket.

6. A tilt mechanism for pivoting a vehicle body panel relative to a vehicle chassis, comprising:
   a support member adapted to connect to said chassis at one portion of said support member, said support member having a tilt axis along a longitudinal extent of said support member, said support member having a support member end, said support member end being adapted to pivotably connect to said body panel at said support member end such that said body panel can pivot about said tilt axis relative to said chassis, and said support member being adapted to support at least part of a vehicle body panel weight,
   a torsion bar within said support member, said torsion bar being secured to said support member at one portion of said torsion bar, said torsion bar having a twist axis along a longitudinal extent of said torsion bar, said twist axis being substantially axially aligned with said tilt axis, said torsion bar having a torsion bar end, and said torsion bar being adapted to bias said body panel relative to said chassis about said twist axis along at least an angular portion of a pivotal range about said tilt axis; and
   said torsion bar end adapted to be seated in an hour-glass-shaped slot formed in said body panel such that said body panel can pivot about said twist axis relative to said chassis without loading said torsion bar over a specified angular range about said tilt axis.

7. A tilt mechanism in accordance with claim 6, further comprising:
   a pivot pin having a pivot pin axis along a longitudinal extent of said pivot pin, said support member adapted to pivotably connect to said chassis about said pivot pin axis by said pivot pin, said pivot pin being adapted to support said at least part of said vehicle body panel weight, and said pivot pin being adapted to provide a single-point pivot attachment of said body panel to said chassis such that said body panel can articulate about said pivot pin axis relative to said chassis.

8. A tilt mechanism in accordance with claim 6, further comprising:
   a tilt restraint adapted to provide a limit on said pivotal range about said tilt axis, said tilt restraint being located within and fixed to said support member, said tilt restraint being axially located along said tilt axis proximate to said support member end, and said tilt restraint being adapted to abut with a surface of said torsion bar at said limit to hinder further pivoting about said tilt axis.

9. A tilt mechanism in accordance with claim 6, further comprising a pivot bracket pivotably attached to said support member end via a bearing, said pivot bracket being adapted to attach to said body panel, said pivot bracket being adapted to pivotably attach said support member end to said body panel.

10. A tilt mechanism for pivoting a vehicle body panel relative to a vehicle chassis, comprising:
    a support member adapted to connect to said chassis at one portion of said support member, said support member having a tilt axis along a longitudinal extent of said support member, said support member having a support member end, said support member end being adapted to pivotably connect to said body panel such that said body panel can pivot about said tilt axis relative to said chassis, said support member being adapted to support at least part of a vehicle body panel weight;
    a torsion bar within said support member, said torsion bar being secured to said support member at one portion of said torsion bar, said torsion bar being adapted to secure to said body panel at a torsion bar end, said torsion bar having a twist axis along a longitudinal extent of said torsion bar, said twist axis being substantially axially aligned with said tilt axis, and said torsion bar being adapted to bias said body panel relative to said chassis about said twist axis along at least an angular portion of a pivotal range about said tilt axis; and a tilt restraint adapted to provide a limit on said pivotal range about said tilt axis, said tilt restraint being located within and fixed to said support member, said tilt restraint being axially located along said tilt axis proximate to said support member end, and said tilt restraint being adapted to abut with a surface of said torsion bar at said limit to hinder further pivoting about said tilt axis.

11. A tilt mechanism in accordance with claim 10, wherein said limit defines a fully open position of said vehicle body panel relative to said vehicle chassis.

12. A tilt mechanism in accordance with claim 10, wherein said limit defines a fully closed position of said vehicle body panel relative to said vehicle chassis.

13. A tilt mechanism in accordance with claim 10, further comprising:

a pivot pin having a pivot pin axis along a longitudinal extent of said pivot pin, said pivot pin axis being generally perpendicular to said tilt axis, said support member being adapted to pivotably connect to said chassis about said pivot pin axis by said pivot pin, said pivot pin being adapt ed to support said at least part of said vehicle body panel weight, and said pivot pin being adapted to provide a single-point pivot attachment of said body panel to said chassis such that said body panel can articulate about said pivot pin axis relative to said chassis.

14. A tilt mechanism in accordance with claim 10, wherein said torsion bar end is adapted to be seated in an hour-glass-shaped slot formed in said body panel such that said body panel can pivot about said twist axis relative to said chassis without loading said torsion bar over a specified angular range about said tilt axis.

15. A tilt mechanism in accordance with claim 10, further comprising:

a pivot bracket, said pivot bracket being adapted to pivotably connect said support member end to said body panel, said pivot bracket being adapted to attach to said body panel, and a bearing attached to said pivot bracket where said support member end attaches to said pivot bracket.

16. A tilt mechanism for pivoting a vehicle body panel relative to a vehicle chassis, comprising:

a pivot pin having a pivot pin axis along a longitudinal extent of said pivot pin, said pivot pin being adapted to support said at least part of said vehicle body panel weight, and said pivot pin being adapted to provide a single-point pivot attachment of said body panel to said chassis such that said body panel can articulate about said pivot pin axis relative to said chassis;

a support member adapted to pivotably connect to said chassis about said pivot pin axis by said pivot pin, said support member having a tilt axis along a longitudinal extent of said support member, said tilt axis being generally perpendicular to said pivot pin axis, said support member having a support member end, said support member end being adapted to pivotably connect to said body panel such that said body panel can pivot about said tilt axis relative to said chassis, said support member being adapted to support at least part of a vehicle body panel weight;

a torsion bar having a twist axis along a longitudinal extent of said torsion bar, said twist axis being substantially axially aligned with said tilt axis, wherein one portion of said torsion bar is secured to said support member and said torsion bar is within said support member, said torsion bar being adapted to bias said body panel relative to said chassis along at least an angular portion of a pivotal range about said tilt axis, said torsion bar having a torsion bar end; and said torsion bar end adapted to be seated in an hour-glass-shaped slot formed in said body panel such that said body panel can pivot about said twist axis relative to said chassis without loading said torsion bar over a specified angular range about said tilt axis.

17. A tilt mechanism in accordance with claim 16, further comprising:

a tilt restrain adapted to provide a limit on a vehicle body panel pivotal range about said tilt axis, said tilt restraint being located within and fixed to said support member, said tilt restraint being axially located along said tilt axis proximate to said support member end, and said tilt restraint being adapted to abut with a surface of said torsion bar at said limit to hinder further pivoting about said tilt axis.

18. A tilt mechanism in accordance with claim 16, further comprising:

first and second compliant members adapted to urge a substantially parallel position of said support member relative to said chassis about said pivot pin axis, said members being proximate to said pivot pin and being adapted to attach to said chassis, said members being prestressed and in contact with said support member when said support member is not being pivoted about said pivot pin axis, said first compliant member being located on a one side of said pivot pin, and said second compliant member being located on another side of said pivot pin.

19. A tilt mechanism in accordance with claim 16, further comprising:

a bearing where said support member end is adapted to pivotably connect to said body panel, said bearing being adapted to transfer said at least part of said body panel weight from said body panel to said support member while also allowing said body panel to pivot about said tilt axis relative to said support member.

20. A tilt mechanism in accordance with claim 16, further comprising:

a pivot bracket, said pivot bracket being adapted to pivotably connect said support member end to said body panel, said pivot bracket being adapted to attach to said body panel, and a bearing attached to said pivot bracket where said support member end attaches to said pivot bracket.

21. A tilt mechanism for pivoting a vehicle body panel relative to a vehicle chassis, comprising:

a chassis bracket adapted to attach to said chassis;

first and second pivot brackets adapted to attach to said body panel;

a pivot pin supported by and extending through said chassis bracket along a pivot pin axis of said pivot pin, said chassis bracket having a clevis structure to receive said pivot pin, said pivot pin being adapted to support at least part of a vehicle body panel weight, and said pivot pin being adapted to provide a single-point pivot attachment of said body panel to said chassis such that said body panel can articulate about said pivot pin axis relative to said chassis;

a support member pivotably connected to said chassis bracket about said pivot pin axis and within said clevis structure at a support member midpoint by said pivot pin, said support member having a tilt axis along a longitudinal extent of said support member, said support member being adapted to support said at least part of said body panel weight;

first and second compliant members adapted to urge a substantially parallel position of said support member relative to said chassis about said pivot pin, said members being proximate to said pivot pin within said clevis structure and being attached to said chassis bracket, and said members being prestressed and in contact with said support member when said support member is not being pivoted about said pivot pin, said first compliant member being attached to said chassis bracket on one side of said pivot pin, said second compliant member being attached to said chassis bracket on another side of said pivot pin;

first and second hard stops formed on said chassis bracket, said hard stops being adapted to limit a support member pivotal range of said support member about said pivot pin;

a flat rectangular-shaped torsion bar within said support member and secured to said support member midpoint at a torsion bar midpoint, said torsion bar having a twist axis along a longitudinal extent of said torsion bar, said twist axis being generally perpendicular to said pivot pin axis and being substantially axially aligned with said tilt axis, said torsion bar being adapted to bias said body panel relative to said chassis along at least an angular portion of a pivotal range about said tilt axis, wherein each end of said torsion bar forms a first and second key pin;

a first hour-glass-shaped slot formed in said first pivot bracket, said first slot being adapted to receive said first key pin such that said first pivot bracket can pivot about said tilt axis relative to said chassis bracket without loading said torsion bar over a specified angular range;

a second hour-glass-shaped slot formed in said second pivot bracket, said second slot being adapted to receive said second key pin such that said second pivot bracket can pivot about said tilt axis relative to said chassis bracket without loading said torsion bar over said specified angular range;

two bearings, one of said bearings being fixed to each of said pivot brackets, said bearings having a bearing rotation axis substantially axially aligned with said tilt axis, each of said bearings forming a socket to receive each end of said support member, said bearings being adapted to transfer said at least part of said body panel weight from said pivot brackets to said support member while also allowing said pivot brackets to pivot about said tilt axis relative to said support member; and a tilt restraint adapted to provide a limit on a pivot bracket rotational range of said pivot bracket about said tilt axis, said tilt restraint being located within and fixed to said support member, said tilt restraint being axially located along said tilt axis proximate to one of said ends of said support member, and said tilt restraint being adapted to abut with a surface of said torsion bar at said limit to hinder further pivoting about said tilt axis.

22. A tilt mechanism in accordance with claim 21, wherein said vehicle body panel is a truck hood and said vehicle chassis is a truck chassis.

23. A method of assisting a pivotal movement of a vehicle body panel relative to a vehicle chassis, comprising the steps of:

supporting at least a portion of a vehicle body panel weight with a first torsional force stored in a torsion bar when said body panel is in a first position, said torsion bar having a twist axis, said torsion bar being adapted to bias said body panel relative to said chassis about said twist axis along at least an angular portion of a pivotal range about a tilt axis, said tilt axis being substantially axially aligned with said twist axis;

pivoting said body panel about said tilt axis relative to said chassis from said first position to a second position;

supporting at least a portion of said body panel weight with said first torsional force stored in said torsion bar about said twist axis as said body panel pivots about said tilt axis from said first position to said second position;

unloading said torsion bar at said second position;

pivoting said body panel about said tilt axis relative to said chassis from said second position to a third position without loading said torsion bar;

loading said torsion bar at said third position;

pivoting said body panel about said tilt axis relative to said chassis from said third position to a fourth position;

supporting at least a portion of said body panel weight with a second torsional force generated in said torsion bar about said twist axis as said body panel pivots about said tilt axis from said third position to said fourth position, said first torsional force having a first rotational direction about said twist axis being opposite of a second rotational direction of said second torsional force about said twist axis; and supporting at least a portion of said body panel weight with said second torsional force stored in said torsion bar when said body panel is in said fourth position.

24. A method in accordance with claim 23, further comprising the step of hindering further pivotal motion of said body panel relative to said chassis about said tilt axis with a tilt restraint at said fourth position such that said tilt restraint provides a limit on pivotal motion about said tilt axis and said limit defines said fourth position.

25. A method in accordance with claim 23, further comprising the steps of pivoting said body panel about said tilt axis relative to said chassis from said fourth position to said third position;

supporting at least a portion of said body panel weight with said second torsional force stored in said torsion bar about said twist axis as said body panel pivots about said tilt axis from said fourth position to said third position;

unloading said torsion bar at said third position;

pivoting said body panel about said tilt axis relative to said chassis from said third position to said second position without loading said torsion bar;

loading said torsion bar at said second position;

pivoting said body panel about said tilt axis relative to said chassis from said second position to said first position;

supporting at least a portion of said body panel weight with said first torsional force generated in said torsion bar about said twist axis as said body panel pivots about said tilt axis from said second position to said first position; and supporting at least a portion of said body panel weight with said first torsional force stored in said torsion bar when said body panel is in said first position.

26. A method in accordance with claim 25, further comprising the step of hindering further pivotal motion of said body panel relative to said chassis about said tilt axis with a tilt restraint at said first position such that said tilt restraint provides a limit on pivotal motion about said tilt axis and said limit defines said first position.

27. A method of installing a vehicle body panel on a vehicle chassis, comprising the steps of:
  supporting at least a portion of a vehicle body panel weight;
  positioning said body panel at an installation angle;
  positioning a tilt mechanism at said installation angle, said tilt mechanism being adapted to pivotably attach said body panel to said chassis, said tilt mechanism having a torsion bar adapted to bias said body panel relative to said chassis about a twist axis of said torsion bar along at least an angular portion of a pivotal range about a tilt axis, said tilt axis of said tilt mechanism being substantially axially aligned with said twist axis;
  compensating for a lack of angular alignment about said tilt axis between said body panel and said chassis by having said installation angle within a dead band about said tilt axis, said dead band being a specified angular range of said pivotal range about said tilt axis where said torsion bar is unloaded when said body panel is attached to said chassis and pivoting about said tilt axis within said specified angular range; and
  attaching said body panel to said chassis via said tilt mechanism without loading said torsion bar.

28. A tilt mechanism for pivoting a vehicle body panel relative to a vehicle chassis, comprising:
  a body panel;
  a chassis;
  a support member connected to said chassis, said support member having a tilt axis along a longitudinal extent of said support member, said support member pivotably connected to said body panel such that said body panel can pivot about said tilt axis relative to said chassis, and said support member adapted to support at least part of a vehicle body panel weight;
  a torsion bar within said support member, said torsion bar secured to said support member at one portion of said torsion bar, said torsion bar having a twist axis along a longitudinal extent of said torsion bar, said twist axis substantially axially aligned with said tilt axis, said torsion bar having a torsion bar end, and said torsion bar adapted to bias said body panel relative to said chassis about said twist axis along at least an angular portion of a pivotal range about said tilt axis; and
  a slot formed in said body panel to receive said torsion bar end,
  wherein said slot allows rotation of said torsion bar end about said twist axis over a specified angular range without loading said torsion bar and substantially limits linear movement of said torsion bar end.

29. A tilt mechanism in accordance with claim 28, said slot having a generally hour-glass shape.

30. A tilt mechanism in accordance with claim 29, wherein a narrowest portion of said hour-glass shape is slightly larger than a thickness of said torsion bar end.

31. A tilt mechanism in accordance with claim 28, said slot having a modified rectangular shape wherein a middle portion of said modified rectangular shape generally corresponds to a thickness of said torsion bar end and two end portions of said modified rectangular shape curve outward.

32. A tilt mechanism in accordance with claim 28, said slot comprising two opposing walls wherein each of said walls curves toward the other of said walls to form an opening that is most narrow near a middle portion of said slot.

33. A tilt mechanism in accordance with claim 32, wherein said most narrow opening near the middle portion of said slot is slightly larger than a thickness of said torsion bar end.

34. A tilt mechanism in accordance with claim 28, said slot comprising two opposing walls wherein each of said walls has a generally convex shape when viewed from a location between said walls.

35. A tilt mechanism in accordance with claim 34, wherein said generally convex walls form a narrowest opening near a middle portion of said slot such that said narrowest opening is slightly larger than a thickness of said torsion bar end.

* * * * *